3,349,143
PROCESS FOR THE REMOVAL OF ALUMINUM CHLORIDE FROM HYDROCARBONS USING CONCENTRATED, AQUEOUS HYDROGEN CHLORIDE
Merritt V. De Lano, Jr., Bartlesville, Okla., assignor to Phillips Petroleum Company, a corporation of Delaware
Filed June 26, 1964, Ser. No. 378,257
9 Claims. (Cl. 260—671)

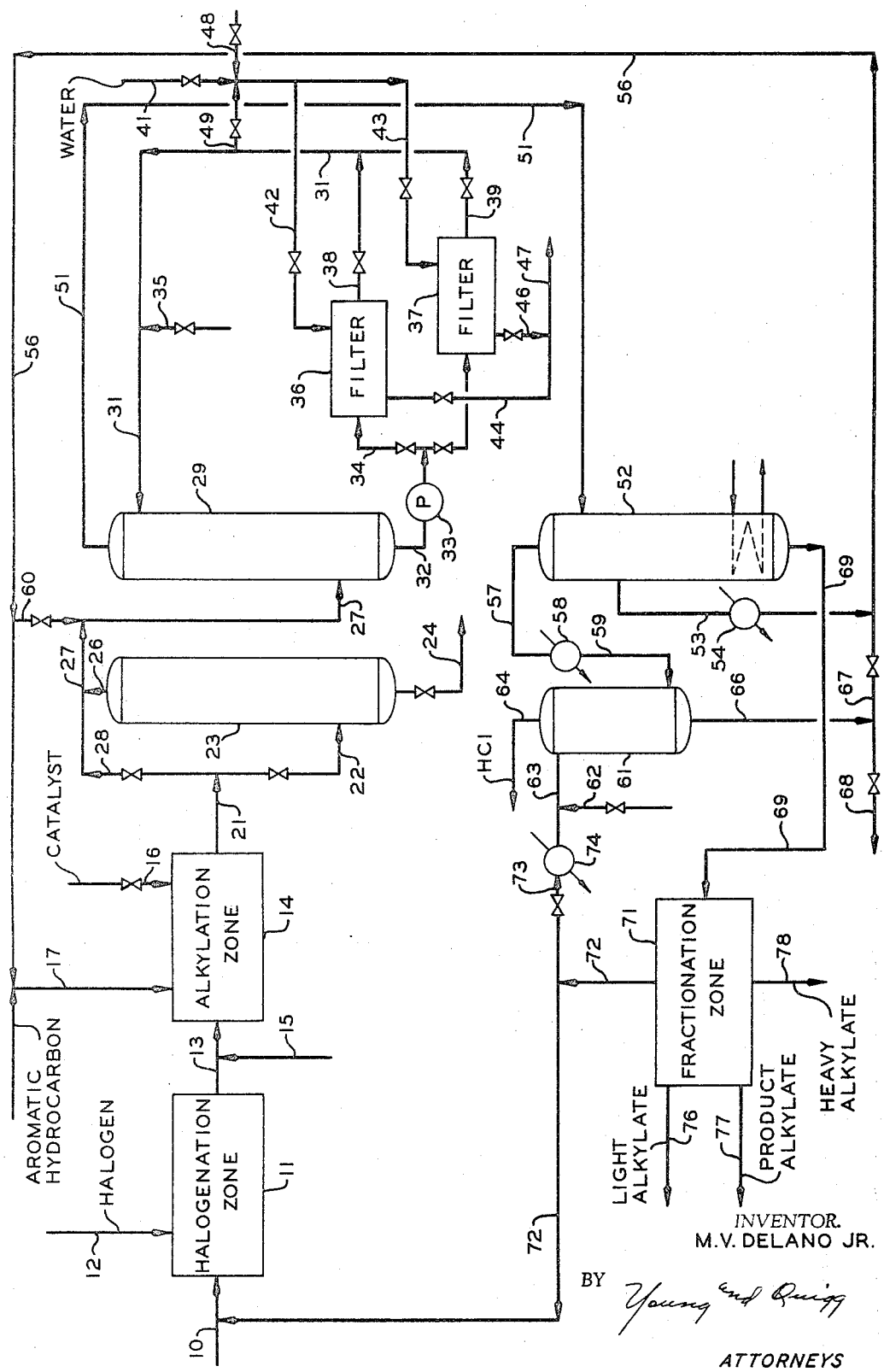

ABSTRACT OF THE DISCLOSURE

Aluminum chloride contained in a hydrocarbon stream is removed therefrom by contacting said stream in a contacting zone with a concentrated aqueous solution of hydrogen chloride whereby a precipitate of aluminum chloride is formed in said hydrogen chloride solution. The precipitated aluminum chloride can be removed from said hydrogen chloride solution by filtration or other suitable means and the hydrogen chloride solution recycled to said contacting zone.

---

This invention relates to the removal of aluminum chloride from hydrocarbon streams. In one aspect this invention relates to a method for removing aluminum chloride catalyst from hydrocarbon stream effluents from hydrocarbon conversion zones wherein conversion of hydrocarbons is effected in the presence of aluminum chloride catalyst. In another aspect this invention relates to a combination of apparatus for removing aluminum chloride from said hydrocarbon streams.

Aluminum chloride has long been used in numerous processes for the conversion of hydrocarbons, including the decomposition or cracking of high-boiling hydrocarbons, isomerization of low-boiling hydrocarbons, polymerization of olefins, and alkylation of alkylatable hydrocarbons. The hydrocarbon effluent obtained from the reaction zone of such processes usually contains a small amount of the aluminum chloride catalyst, sometimes in an amount as small as about 0.01 weight percent. The concentration of aluminum chloride in such hydrocarbon streams will usually be within the range of from about 100 to about 1000 p.p.m. However, the invention is applicable to hydrocarbon streams containing concentrations of aluminum chloride outside this range. Although this amount of aluminum chloride in the hydrocarbon stream may be small, and the aluminum chloride may be completely soluble in the hydrocarbon, the presence thereof in the hydrocarbon stream gives rise to numerous troubles in process equipment. The presence of the aluminum chloride results in serious fouling of heat exchangers, condensers, reboilers and other parts of the equipment used in the process. In addition, corrosion is a serious problem resulting in malfunctioning of valves, pumps, control mechanisms, and the like. A major obstacle is encountered in reaction systems where a clean, representative sample of a hydrocarbon stream must be obtained for analysis in automatic analyzing equipment.

Methods resorted to heretofore to effect the separation of aluminum chloride from hydrocarbon streams include adsorption on surface active media such as bauxite and charcoal, water washing, and flash evaporation. Separation of entrained aluminum chloride catalyst can be achieved to a substantial degree by passage of the hydrocarbon stream through a bed of highly adsorptive material. However, such adsorbents are not very effective in removing aluminum chloride catalyst contaminants dissolved in the hydrocarbon stream. Another disadvantage to the use of adsorbents is that the adsorptive material usually contains a sufficient amount of water to form corrosive hydrogen chloride which can cause serious corrosion problems in the apparatus. Water washing is an effective method for removing aluminum chloride from hydrocarbon streams and is simple in principle. However, complicated mechanical equipment is required since the water hydrolyzes the aluminum chloride and forms corrosive hydrogen chloride. Also, where the hydrocarbon stream is to be analyzed for hydrogen chloride content, water washing cannot be used to remove the aluminum chloride since the hydrogen chloride content will be changed in the water washing process. Flash evaporation of the sample stream is an effective method for removing aluminum chloride from hydrocarbon streams provided the ratio of heavy to light hydrocarbons is constant and provided the flash temperature can be maintained low enough to minimize the carryover of aluminum chloride. The temperature and pressure of flashing are very critical so that this method of removing aluminum chloride is difficult to control.

I have discovered that aluminum chloride catalyst contained in a hydrocarbon stream effluent from a hydrocarbon conversion zone, wherein hydrocarbons are converted in the presence of aluminum chloride catalysts, can be removed by contacting said effluent with a concentrated aqueous solution of hydrogen chloride. Surprisingly, when said hydrocarbon streams containing aluminum chloride catalyst are contacted with a concentrated aqueous solution of hydrogen chloride, there is formed in said solution a precipitate of aluminum chloride. Thus, broadly speaking, the present invention resides in removing aluminum chloride contained in a hydrocarbon stream by contacting said stream with a concentrated aqueous solution of hydrogen chloride whereby a precipitate of aluminum chloride forms in said hydrogen chloride solution, separating said precipitate from said solution, and returning said precipitate-free hydrogen chloride solution to said contacting step; and an apparatus for carrying out said removal of aluminum chloride from said streams.

An object of this invention is to provide a convenient, economical and highly satisfactory method for purifying a hydrocarbon stream effluent from a hydrocarbon conversion carried out in the presence of aluminum chloride catalyst. Another object of this invention is to provide a method for removing aluminum chloride catalyst from a hydrocarbon stream effluent obtained from a hydrocarbon conversion carried out in the presence of said catalyst without substantially altering the composition of said effluent. Another object of this invention is to provide a method for removing aluminum chloride catalyst from a hydrocarbon stream effluent from a hydrocarbon conversion process carried out in the presence of said catalyst and promoted with hydrogen chloride without substantially altering the composition of said effluent and without removing hydrogen chloride contained in said effluent. Another object of this invention is to provide a method for removing aluminum chloride from hydrocarbon streams to reduce corrosion and clogging of processing equipment employed in processing said streams. Another object of this invention is to provide a method for recovering aluminum chloride catalyst from hydrocarbon streams containing the same. Still another object of this invention is to provide a method of recovering hydrogen chloride produced in hydrocarbon conversion processes carried out in the presence of aluminum chloride catalyst. Still another object of this invention is to provide an apparatus which can be employed in carrying out the above-described methods. Other aspects, objects, and advantages of the invention will be apparent to those skilled in the art in view of this disclosure.

Thus, according to the invention, there is provided a process for removing aluminum chloride from a hydrocarbon stream containing the same, which process comprises the steps of: contacting said stream with a concentrated aqueous solution of hydrogen chloride whereby a precipitate of aluminum chloride forms in said hydrogen chloride solution; separating said precipitated aluminum chloride from said hydrogen chloride solution; and returning said hydrogen chloride solution to said contacting step.

Further, according to the invention, there is provided an apparatus for removing aluminum chloride from hydrocarbon streams, said apparatus comprising means for contacting said streams with a concentrated aqueous solution of hydrogen chloride whereby a precipitate of aluminum chloride forms in said solution, means for separating said precipitate from said solution, and means for returning said precipitate-free solution to said contacting means.

It is to be noted that a precipitate forms when the hydrocarbon stream containing the aluminum chloride dissolved therein is contacted with the concentrated aqueous solution of hydrogen chloride. This was unexpected. In such a contacting step one would expect that the concentrated hydrogen chloride solution would extract aluminum chloride from the hydrocarbon stream in an amount up to the limit of solubility of the aluminum chloride in the hydrogen chloride solution (or until equilibrium is established) and then not remove any further aluminum chloride from the hydrocarbon stream. Instead, for reasons not completely understood at present, the concentrated aqueous hydrogen chloride solution continues to extract aluminum chloride from the hydrocarbon stream beyond the limits of solubility of aluminum chloride in said solution and the excess aluminum chloride thus extracted precipitates in said solution. This unexpected result makes possible the removal of the precipitated aluminum chloride from the hydrogen chloride solution and the return of the precipitate-free hydrogen chloride solution to the contacting step for further use; thus making possible the provision of the convenient, economical and highly satisfactory method of the invention for removing aluminum chloride from hydrocarbon streams.

An important advantage of the invention is that aluminum chloride can be removed from hydrocarbon streams without concomitantly removing dissolved hydrogen chloride which may be present in said streams. Hydrogen chloride is a relatively expensive chemical and the provision of same as a promoter in hydrocarbon conversion processes catalyzed by aluminum chloride catalyst is a major expense item of such processes. This advantage of the invention is particularly important in those conversion processes where hydrogen chloride is produced in the conversion zone, e.g., the alkylation of aromatics wtih alkyl halides, because said produced hydrogen chloride can be subsequently recovered as a product of the process.

It is well known that aluminum chloride forms a complex or complexes with hydrocarbons and said complex or complexes have catalytic properties. The chemistry of aluminum chloride catalysis of hydrocarbon conversions is not completely understood. It is presently believed by those skilled in the art that aluminum chloride per se and aluminum chloride-hydrocarbon complexes both exert catalytic activities in said conversions. Thus, herein and in the claims, unless otherwise specified, the term "aluminum chloride catalyst" is employed generically to include both aluminum chloride and aluminum chloride-hydrocarbon complexes.

Referring now to the drawing, the invention will be more fully explained. Said drawing is a schematic flow sheet of one type of hydrocarbon conversion process having incorporated therein one embodiment of the present invention. The process illustrated comprises the alkylating of an aromatic hydrocarbon with an alkyl halide to produce a detergent grade alkylate. It will be understood that said drawing is diagrammatic in nature and many valves, pumps, condensers, surge tanks, control instruments, etc., not necessary for explanation of the invention to those skilled in the art, have been omitted. In the process illustrated in said drawing, a suitable hydrocarbon mixture comprising predominantly normal paraffinic and isoparaffinic hydrocarbons of suitable boiling range, such as a $C_{10}$ to $C_{15}$ or a $C_{13}$ to $C_{15}$ fraction, is introduced via conduit 10 into photochemical halogenation zone 11 wherein it is contacted in the presence of light with a halogenating agent introduced via conduit 12. Usually the hydrocarbon fraction introduced into halogenation zone 11 will preferably contain a high percentage of normal paraffinic hydrocarbons. Such a fraction can be obtained by contacting kerosene with a suitable molecular sieve. However, it is within the scope of the invention to utilize mixtures of hydrocarbons which comprise predominantly branched chain paraffin hydrocarbons. If desired, the hydrocarbon introduced via conduit 10 can be a pure or essentially pure paraffinic hydrocarbon.

Chlorine is the presently most preferred halogenating agent. Any suitable halogenation conditions can be employed in said halogenation zone but it is preferred to select conditions which provide about 20 percent conversion of the hydrocarbons to halogenated hydrocarbons per pass. Said conditions will include a temperature within the range of from 0 to 100° F., preferably 20 to 50° F., a pressure within the range of from 20 to 100 p.s.i., preferably 30 to 50 p.s.i., and a reaction time within the range of 8 to 20 seconds. It will be understood that said conditions are interrelated and variation in one condition will be accompanied by variation in one or more of the other conditions. For example, when using the preferred halogenating agent (chlorine), pressure is employed to maintain the hydrocarbon in liquid phase (if necessary) and also to increase the solubility of gaseous chlorine in said hydrocarbons. The amount of pressure actually employed will depend upon the hydrocarbons present, the temperature, and the desired conversion level. With respect to temperature, higher temperatures favor the formation of dichlorides which is undesirable. Higher conversion rates also favor the formation of dichlorides. It is preferred to select conditions such that the ratio of monochlorides to dichlorides is within the range of from 4:1 to 30:1, preferably 7:1 to 12:1, more preferably about 9:1. The chlorination reaction is a photochemical reaction and is carried out by dissolving the chlorine in the hydrocarbon and then exposing the resulting mixture or solution to ultraviolet light under time, temperature, and pressure conditions within the ranges set forth above.

It is to be understood that the invention is not limited to employing photochemical halogenation in the halogenation step. Haloalkanes prepared by any other suitable halogenation method such as thermal and catalytic methods can be employed in the practice of the invention. Halogenating agents in addition to those mentioned above which can be empolyed include sulfuryl chloride, thionyl chloride, and others. Halogenation catalysts which can be employed include ferric chloride, antimony chloride, sulfur chloride, iodoform, benzoyl peroxide and others. It should also be understood that it is within the scope of the invention to introduce pure or substantially pure halohydrocarbons from any source into the system via conduit 15, instead of or in addition to the halohydrocarbons from conduit 13.

A mixture of halogenated and nonhalogenated hydrocarbons is withdrawn from halogenation zone 11 via conduit 13 and introduced into alkylation zone 14. A suitable alkylation catalyst, such as aluminum chloride and/or aluminum chloride-hydrocarbon complex is introduced into alkylation zone 14 via conduit 16. A suitable alkylatable hydrocarbon is introduced into zone 14 via conduit 17. The process is applicable to the alkylation of benzene, toluene, xylene, and the like and is particularly applicable to the alkylation of benzene (the preferred aromatic hydrocarbon) with the halogenated n-paraffinic and isoparaffinic hydrocarbons containing from 10 to 15 carbon atoms. In some instances high aromatic content naphtha fractions boiling within the range of from about 175 to about 300° F., such as can be obtained from thermally cracked naphthas, can be employed as a source of alkylatable aromatic hydrocarbon. A particularly desirable catalyst is the complex of hydrocarbon with aluminum chloride. In addition to the catalyst it is desirable that the corresponding hydrogen halide be present in the reaction zone since this material maintains catalyst activity at a high level. The reaction rate and the conversion of the hydrocarbon feed is dependent on the amount of aluminum chloride in the aluminum chloride-hydrocarbon complex. However, the quantity of aluminum chloride in the complex can be varied over wide ranges to provide a corresponding range of feed reactant conversion. While the over-all activity of the catalyst is established by the aluminum chloride content, as stated, the presence of hydrogen chloride is required to provide a high activity. Usually the quantity of hydrogen chloride present is between about 0.5 and about 6 weight percent of the feed with about 2 to 4 weight percent being preferred. It is usually not necessary to add additional hydrogen chloride because the hydrocarbon charge will contain HCl liberated in the previous chlorination step. Also, HCl is liberated in the alkylation reaction.

The aluminum chloride-hydrocarbon complex catalyst can be originally prepared by mixing aluminum chloride and kerosene in a weight ratio of about 8:5. During operation of the process, the original complex catalyst is replaced with complex catalyst formed in the process. The heat of hydrolysis of the catalyst is usually in the range 150–250, more usually in the order of about 200, calories per gram. Catalyst having higher heats of hydrolysis, e.g., 300–325 calories per gram, can also be used with good results. The viscosity of the catalyst is usually in the order of 8 to 16, more generally in the order of 10 to 12 centipoises at 100° F.

The conditions employed in alkylation zone 14 will depend upon the catalyst employed, the aromatic hydrocarbon to be alkylated, and the boiling points of the haloalkanes. As will be understood by those skilled in the art, said conditions are interrelated. When employing the above-described aluminum chloride catalysts, the alkylation will generally be carried out at a temperature within the range of from 50 to 110° F. with a pressure sufficient to maintain liquid phase conditions and to prevent vaporization of catalyst. When operating in a continuous system, flow rates of reactants should be maintained such that the residence or contact time in the contactor or reaction zone is within the range of from about 10 minutes to about 30 minutes, preferably from about 10 to about 20 minutes.

The ratio of the total reactants feed to the reactor or alkylation zone, i.e., the sum of the aromatic hydrocarbon plus the mixture of haloalkanes, to the aluminum chloride catalyst will usually be within the range of from about 1:5 to 2:1, preferably about 1:1, on a volume basis. The mol ratio of the aromatic hydrocarbon to the haloalkanes entering the alkylation zone should be such as to furnish at least one mole of aromatic hydrocarbon, e.g., benzene, per gram atom of halogen on the haloalkanes. It is preferred to operate with an excess of aromatic hydrocarbon. Thus, the mol ratio of the aromatic hydrocarbon to the haloalkanes can vary over a wide range but will generally be maintained within the range of from about 2:1 to 30:1, preferably from 8:1 to 15:1.

It will be understood that alkylation zone 14 includes, in addition to a suitable contactor or reactor for carrying out the alkylation reaction, a separation vessel or zone wherein a hydrocarbon phase is separated from the catalyst phase and returned to said contactor or reactor. Said hydrocarbon phase is withdrawn from zone 14 via conduit 21 and passed via conduit 22 into the lower portion of coalescer 23 for removal of entrained aluminum chloride catalyst. Said coalescer 23 can comprise any suitable type of vessel and conveniently comprises an upright tower containing a bed of any suitable contacting material such as porcelain saddles, Raschig rings, gravel, anthracite coal, etc. Coalesced and separated catalyst is withdrawn from the bottom of vessel 23 via conduit 24. Hydrocarbon phase, now substantially free of entrained catalyst but still containing dissolved aluminum chloride catalyst is withdrawn from said coalescer via conduit 26. In some instances where the amount of entrained catalyst in the hydrocarbon stream in conduit 21 is negligibly small, said hydrocarbon stream can be passed around said coalescer via conduit 28 and introduced into said conduit 27.

The hydrocarbon stream in conduit 27 is then introduced into the lower portion of contacting or extraction vessel 29. A stream of concentrated aqueous hydrogen chloride solution is introduced into the upper portion of said contacting vessel 29 via conduit 31. In said vessel 29, said hydrocarbon stream and said hydrogen chloride solution are contacted countercurrently. A phase separation occurs with the formation of an interface intermediate the ends of said vessel 29. Upon the contacting of said streams aluminum chloride is extracted from said hydrocarbon stream into said hydrogen chloride solution and a precipitate of aluminum chloride

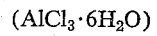

$$(AlCl_3 \cdot 6H_2O)$$

forms in said solution after it has become saturated with aluminum chloride. Hydrogen chloride solution having said precipitate suspended therein is withdrawn from vessel 29 via conduit 32 and passed by means of pump 33 into conduit 34 for passage through one of filters 36 and 37. Said filters are employed in conventional alternate onstream-offstream arrangement by means of the manifolding shown. Said filters can be any suitable type of filter for removing a finely divided solid from a liquid. Examples of such filters are the well known plate and frame filters which are commonly employed in a horizontal position as illustrated. Other types of filters which can be employed in the practice of the invention are vertical towers containing a bed of any suitable filter medium such as sand, or any other inert medium. It will be understood that said filters are fabricated from suitable acid-resistant materials such as glass-lined vessels, Hastelloy, etc.

Filtrate, free of said precipitate, is withdrawn from the filter in service via either conduit 38 or conduit 39 and introduced into said conduit 31 for return to contacting vessel or zone 29. Make-up concentrated aqueous hydrogen chloride solution or water, as required, can be added to the system via conduit 35. When the pressure drop across the filter reaches the desired or permissible operating maximum, e.g., 60 to 100 p.s.i., or said filter becomes ineffective for removal of precipitate, the filter in service is removed therefrom and the stream of hydrogen chloride solution from vessel 29 is switched into the other filter. Said filter which has been removed from service is then regenerated by backwashing with water introduced from conduit 41 and into the filter to be regenerated via either conduit 42 or conduit 43 by means of the manifolding arrangement shown. Water containing dissolved aluminum chloride is withdrawn from the filter being regenerated via either conduit 44 or conduit 46 and passed via conduit 47 to any suitable means for recovery of aluminum chloride therefrom. Upon completion of backwashing of the spent filter it is preferably dried by means of a stream of gas such as air or combustion gases introduced from a suitable source into the manifolding arrangement via conduit 48. If desired, instead of backwashing said spent filter with water, a portion of the circulating hydrogen chloride solution in conduit 31 can be passed via conduit 49 into the manifolding arrangement shown for backwashing of said spent filter.

Hydrocarbon stream, now essentially or completely free of aluminum chloride, is withdrawn from said vessel or contactor 29 via conduit 51 and introduced into benzene tower 52. Said tower 52 operates as a benzene and hydrogen chloride stripper tower. Since the hydrocarbon stream introduced thereinto is now essentially free of dissolved aluminum chloride, a much higher temperature can be tolerated in the reboiler portion of said tower 52. This permits withdrawal of a sidestream of essentially pure benzene vapors (uncontaminated with HCl) from the side of tower 52 via conduit 53 and condenser 54. Operating conditions on said tower 52 will generally be as follows: top of tower, 70 to 250, preferably 70 to 150° F.; bottom of tower, 350 to 600° F.; and pressure, 15 to 50 p.s.i.a. When the feed to tower 52 contains aluminum chloride (as in the absence of this invention) the bottom temperature of tower 52 cannot exceed 300° F. without causing excessive deposition and corrosion problems. Even more important, in many instances the conversion product, e.g., the alkylate in the illustrated process, cannot be heated to temperatures in excess of 300° F. in the presence of aluminum chloride catalyst without causing decomposition or degradation of said alkylate. At such temperatures benzene cannot be effectively and efficiently removed from the alkylate in a single tower along with the hydrogen chloride. Two towers are required, one for hydrogen chloride removal and another for benzene removal. The condensed benzene stream is then introduced into conduit 56 for recycle to alkylation zone 14. In practice, it will generally be convenient to provide a surge tank (not shown) downstream of condenser 54, as will be understood by those skilled in the art. Hydrogen chloride gas, together with a relatively small amount of benzene vapors, is withdrawn overhead from said tower 52 via conduit 57, condenser 58, and introduced via conduit 59 into the lower portion of benzene absorber 61 which can comprise any suitable type of vessel containing a bed of suitable contacting material such as Burl saddles, Raschig rings, etc. A stream of a suitable absorption medium, such as normal paraffins, from any suitable source is introduced via conduits 62 and 63 into the upper portion of absorber 61. Said absorber 61 is preferably operated "cold," e.g., at a temperature within the range of from 40 to 80° F. If necessary, it is within the scope of the invention to supply sufficient refrigeration to condenser 58 and cooler 74 to attain these temperatures. Pressure in said absorber 61 is not critical and is usually within the range of from 15 to 45 p.s.i.a. Hydrogen chloride gas passes upwardly through the bed of contact material in said absorber 61 and is withdrawn therefrom via conduit 64 and passed to compression as a product of the process. If necessary or desirable, said hydrogen chloride stream in conduit 64 can be dried by any suitable means prior to or after compression. Also, in those conversion processes wherein hydrogen chloride is not produced in the conversion zone, a portion or all of the hydrogen chloride in said conduit 64 can be returned to said conversion zone as the hydrogen chloride promoter for the catalyst utilized therein. Benzene and absorption medium are withdrawn from the bottom of absorber 61 via conduit 66 and passed via conduit 67 into said conduit 56 for recycle as previously described. In some instances, the stream in said conduit 66 may contain an objectionable amount of water. If so, it can be passed via conduit 68 to a suitable drying means (not shown) for drying prior to recycle or other use. The stream in said conduit 66 can also be introduced into contactor 29 via conduits 67, 56, 60 and 27, if desired.

Alkylate, now free of benzene and dissolved hydrogen chloride, is withdrawn from the bottom of tower 52 via conduit 69 and introduced into fractionation zone 71. Said fractionation zone 71 can comprise any suitable number of conventional fractionators for making the desired separation. An overhead fraction comprising non-halogenated hydrocarbons is withdrawn from said fractionation zone 71 via conduit 72 for recycle to said halogenation zone 11. If desired, a portion of said nonhalogenated hydrocarbons can be passed via conduit 73 and condenser 74 into said conduit 63 as the absorption medium for utilization in absorber 61. Usually, a light alkylate stream comprising a mixture of nonhalogenated paraffinic and product alkylate is withdrawn via conduit 76 to suitable storage or other use. A product alkylate stream withdrawn via conduit 77 is comprised principally of monoalkyl aromatic compounds and is the detergent grade alkylate product of the process. A bottoms or heavy alkylate stream withdrawn from fractionation zone 71 via conduit 78 comprises a high molecular weight, high density material and can be utilized as a high density fuel stock.

While the invention has been described with particular reference to employing countercurrent contacting in said contacting zone 29 and then filtering the circulating aqueous hydrogen chloride solution, it is within the scope of the invention to employ other contacting methods and means. For example, an ordinary mixing tank and settling tank can be employed, either in batchwise or continuous operation. If batchwise operation is employed, the hydrocarbon stream to be treated and the concentrated aqueous hydrogen chloride solution are mixed in a suitable mixing vessel, the formed precipitate allowed to settle, and the essentially aluminum chloride-free hydrocarbon stream decanted therefrom. In a continuous operation, said streams are mixed in a first mixing vessel and then passed through a suitable series of subsequent settling vessels for separation of the formed precipitate. Still another method and means of contacting which can be employed comprises a mixing pump for mixing said streams and passing the mixture to a suitable centrifuge or cyclone separator for separation of the formed precipitate therefrom. Thus, it is within the scope of the invention to employ any suitable contacting and precipitate separating methods and means.

The volume of concentrated aqueous hydrogen chloride solution employed in contacting the hydrocarbon streams to be treated can vary over a relatively wide range. The actual volume employed will depend somewhat upon the aluminum chloride concentration in said hydrocarbon stream and the desired degree of aluminum chloride removal therefrom. Thus, the invention should not be limited to employing any particular amount of concentrated aqueous hydrogen chloride solution for contacting the hydrocarbon stream to be treated. Generally speaking, the volume ratio of concentrated aqueous hydrogen chloride solution to hydrocarbon stream to be treated will be within the range of from 1:1 to 1:6, preferably 1:1 to 1:4. A more preferred volume ratio for some operations is 1:2, i.e., one volume of concentrated aqueous hydrogen chloride solution to two volumes of hydrocarbon solution to be treated.

The concentration of hydrogen chloride in the aqueous hydrogen chloride treating solution will depend somewhat upon the amount of hydrogen chloride dissolved in the hydrocarbon stream to be treated since the concentration of HCl in these two streams tends to come to equilibrium, particularly in a continuous treating system such as that illustrated in the drawing. Since in most instances it is desirable in the practice of the invention to remove aluminum chloride but not remove dissolved hydrogen chloride from the hydrocarbon stream being treated, the concentration of the aqueous hydrogen chloride treating solution will in most instances be such that no dissolved hydrogen chloride will be removed from the hydrocarbon stream. Preferably, the concentration of hydrogen chloride in the aqueous hydrogen chloride treating solution will be such as to reduce the solubility of aluminum chloride in said treating solution. Generally speaking, the concentration of hydrogen chloride in said treating solution will be in the range of from 25 to 50, preferably 30 to 45, more preferably 35 to 40 weight percent. For example, when the hydrocarbon stream being treated contains about 1.5 weigh percent dissolved hydrogen chloride, a preferred concentration of hydrogen chloride in the aqueous treating solution will be about 38 weight percent.

The invention should not be limited to any particular operating conditions with respect to temperature and pressure in the contacting and precipitate separation zones. The contacting of the hydrocarbon stream to be treated with the aqueous hydrogen chloride treating solution can be conveniently carried out at a temperature within the range of from 40 to 120, preferably 50 to 100, more preferably 60 to 90° F. The pressure will be determined by the temperature and the concentration of hydrogen chloride in the aqueous treating solution. Said pressure will generally be within the range of from substantially atmospheric to about 50 to 75 p.s.i.a. Generally speaking, the temperature and pressure in the precipitate separation zone will be within the same ranges as those given above for the contacting step.

The following examples will serve to further illustrate the invention.

*Example I*

In a first series of runs, sample portions of a hydrocarbon mixture containing 33.3 weight percent dodecane and 66.7 weight percent benzene were individually contacted with separate aqueous hydrogen chloride solutions having various concentrations of hydrogen chloride. In these runs one volume of hydrogen chloride solution was mixed with one volume of said hydrocarbon mixture in a separatory funnel and vigorously agitated for several minutes. The two phases were then permitted to separate and the concentration of hydrogen chloride in the water phase and in the hydrocarbon phase was then determined. The concentration of water in said hydrocarbon phase was also determined. Results of these tests are set forth in Table I below.

TABLE I.—SOLUBILITY OF HCl IN HYDROCARBON* AT ROOM TEMPERATURE (75–80° F.)

| Water Phase, wt. percent HCl | Hydrocarbon Phase | |
|---|---|---|
| | Wt. percent HCl | Wt. percent $H_2O$ |
| 18.3 | 0.0024 | 0.0466 |
| 27.4 | 0.016 | 0.0177 |
| 34.1 | 0.276 | 0.0089 |
| 36.0 | 0.456 | ---------- |

*33.3 wt. percent dodecane, 66.7 wt. percent benzene.

The results of the above tests show that a hydrocarbon stream containing dissolved hydrogen chloride can be contacted with a concentrated aqueous solution of hydrogen chloride without removing the dissolved hydrogen chloride from said hydrocarbon stream. By other means it was determined that for a hydrocarbon stream containing about 1.5 weight percent dissolved hydrogen chloride it is desirable that the aqueous hydrogen chloride treating stream contain about 38 weight percent hydrogen chloride.

*Example II*

In another series of runs, a sample of the same mixture of benzene and dodecane employed in Example I was saturated with aluminum chloride. Separate portions of the aluminum chloride saturated hydrocarbon were then washed by vigorous agitation for several minutes in a separatory funnel with a concentrated aqueous solution of hydrogen chloride containing 35 weight percent HCl employing acid to hydrocarbon volume ratios of 1:1, 1:2, and 1:4. After separation of the hydrocarbon and aqueous phases the aluminum concentration in the hydrocarbon phase was then determined. Results of these runs are set forth in Table II below.

TABLE II.—$AlCl_3$ EXTRACTION WITH CONCENTRATED HCl SOLUTION

| | HCl solution to hydrocarbon, volume ratio | Mg. Al per ml. of hydrocarbon phase |
|---|---|---|
| Untreated hydrocarbon | 0 | 0.28 |
| Treated hydrocarbon | 1:1 | 0.03 |
| Do | 1:2 | 0.03 |
| Do | 1:4 | <0.01 |

*Example III*

In another series of runs, a sample of the settler hydrocarbon phase effluent from a pilot plant operated for the alkylation of benzene with $C_{13}$ to $C_{15}$ alkyl chlorides employing aluminum chloride-hydrocarbon complex as catalyst was extracted with a concentrated aqueous solution of hydrogen chloride containing 35 weight percent hydrogen chloride. The extraction was carried out in the same manner as in Example II employing acid to hydrocarbon volume ratios of 1:1 and 1:2. After separation of the hydrocarbon and aqueous phase the aluminum concentration in the hydrocarbon phase was then determined. Results of these runs are set forth in Table III below.

TABLE III.—$AlCl_3$ EXTRACTION WITH CONCENTRATED HCl SOLUTION

| | HCl solution to hydrocarbon, volume ratio | Mg. Al per ml. of hydrocarbon phase |
|---|---|---|
| Untreated hydrocarbon | 0 | 0.05 |
| Treated hydrocarbon | 1:1 | <0.01 |
| Do | 1:2 | <0.01 |

*Example IV*

In another run, one 75-milliliter portion of a 34.1 weight percent hydrogen chloride aqueous solution was used for separately contacting ten separate portions of the settler hydrocarbon phase effluent from a pilot plant operated for the alkylation of benzene with $C_{13}$–$C_{15}$ alkyl chlorides employing aluminum chloride-hydrocarbon complex as catalyst. In these runs 150-milliliter portions of fresh hydrocarbon were used for five washings, then 130-milliliter portions were used for five additional washings, with the same 75 milliliters of acid used in each washing. Said washings were carried out by vigorous agitation of the acid solution and hydrocarbon in a separatory funnel. The hydrocarbon and acid phases were separated after each washing. A precipitate formed in the acid solution at the start of the washings and continued throughout the runs. A 5-mililiter sample of the acid phase was taken after the first, the fifth, and the tenth washings. The concentration of aluminum chloride and water in the hydrocarbon phase and the concentration of aluminum chloride in the aqueous acid phase were determined after the first, fifth, and tenth washings. The results of these tests are set forth in Table IV below.

TABLE IV.—MULTIPLE WASHINGS OF SETTLER HYDROCARBON EFFLUENT

[Vol. of 34.1 wt. percent acid used, 75 ml.; Conc. of $AlCl_3$ in settler effluent, 975 p.p.m.]

| Cumulative Vol. HC* washed, ml. | $AlCl_3$ Conc. in HCl Phase, p.p.m. | $AlCl_3$ Conc. in Washed HC*, p.p.m. |
|---|---|---|
| 150 | 1,680 | <5 |
| 750 | 2,580 | <5 |
| 1,400 | 2,550 | <5 |

*Hydrocarbon.

The results of the above tests given in Table IV show that the hydrogen chloride solution continued to extract aluminum chloride from the hydrocarbon even after it was saturated with aluminum chloride.

While the invention has been described above with particular reference to a conversion process wherein aluminum chloride is employed as the catalyst in the alkylation of benzene with alkyl halides, the invention is not so limited. The invention is applicable to removing aluminum chloride from hydrocarbon streams in any conversion process wherein aluminum chloride is employed as the catalyst and the hydrocarbon streams from said conversion contain aluminum chloride. The invention is also applicable to removing aluminum chloride from hydrocarbon streams other than hydrocarbon streams from hydrocarbon conversion processes. Thus, the invention is applicable to the removal of aluminum chloride from hydrocarbon streams containing the same from any source, regardless of whether or not the aluminum chloride has been employed as a catalyst.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. A process for removing aluminum chloride from a hydrocarbon stream, which process comprises the steps of: contacting said stream with a concentrated aqueous solution of hydrogen chloride whereby a precipitate of aluminum chloride forms in said hydrogen chloride solution; separating said precipitated aluminum chloride from said hydrogen chloride solution; and returning said last mentioned hydrogen chloride solution to said contacting step.

2. A process for removing aluminum chloride catalyst from a hydrocarbon reaction effluent, which process comprises: countercurrently contacting said effluent in a contacting zone with a concentrated aqueous solution of hydrogen chloride whereby a precipitate of aluminum chloride forms in said hydrogen chloride solution; withdrawing essentially aluminum chloride-free effluent from said contacting zone; withdrawing hydrogen chloride solution having said precipitate suspended therein from said contacting zone; filtering said withdrawn hydrogen chloride solution to remove said precipitate therefrom; and returning hydrogen chloride solution filtrate to said contacting zone.

3. In a hydrocarbon conversion process wherein conversion is effected in the presence of an aluminum chloride catalyst and hydrogen chloride promoter therefor and wherein the hydrocarbon effluent from said conversion zone contains a small but appreciable amount of said catalyst and said promoter, the improvement comprising: contacting said effluent in a contacting zone with a concentrated aqueous solution of hydrogen chloride whereby a precipitate of aluminum chloride forms in said hydrogen chloride solution; recovering essentially aluminum chloride-free effluent from said contacting zone; separating said precipitate from said hydrogen chloride solution; and returning precipitate-free hydrogen chloride to said contacting zone.

4. A process according to claim 3 wherein the concentration of hydrogen chloride in said hydrogen chloride solution is within the range of from 25 to 50 weight percent, and said hydrogen chloride solution and said hydrocarbon effluent are contacted in a volume ratio within the range of from 1:1 to 1:6.

5. A continuous process for removing aluminum chloride catalyst from the hydrocarbon effluent from a hydrocarbon conversion catalyzed by aluminum chloride catalyst and HCl promoter, which process comprises: introducing said effluent into the lower portion of an extraction zone; introducing a stream of concentrated aqueous hydrogen chloride into the upper portion of said extraction zone; in said extraction zone, countercurrently contacting said effluent and said aqueous hydrogen chloride solution whereby a precipitate of aluminum chloride forms in said hydrogen chloride solution; withdrawing treated effluent, essentially free of aluminum chloride, from the upper end of said extraction zone; withdrawing said hydrogen chloride solution containing said precipitate suspended therein from the lower end of said extraction zone; separating said precipitate from said withdrawn hydrogen chloride solution; and returning precipitate-free hydrogen chloride solution to the upper portion of said extraction zone.

6. The process of claim 5 wherein the concentration of hydrogen chloride in said hydrogen chloride solution is within the range of from 30 to 45 weight percent, said hydrogen chloride solution and said hydrocarbon effluent are contacted in a solution to hydrocarbon volume ratio within the range of from 1:1 to 1:4, and said precipitate is separated from said withdrawn hydrogen chloride solution by filtration.

7. A process for the production of a detergent grade alkylate, which process comprises, in combination, the steps of: chlorinating n-paraffinic and isoparaffinic hydrocarbons containing from 10 to 15 carbon atoms per molecule with chlorine in a chlorination zone under chlorination conditions to produce a mixture of chlorinated and nonchlorinated hydrocarbons; alkylating benzene with said mixture of hydrocarbons in an alkylation zone in the presence of an aluminum chloride catalyst and a hydrogen chloride promoter under alkylation conditions to form an alkylate stream; introducing said alkylate stream into the lower portion of an extraction tower; introducing a stream of concentrated aqueous hydrogen chloride containing from 25 to 50 weight percent of hydrogen chloride into the upper portion of said extraction tower; in said extraction tower, countercurrently contacting said alkylate stream and said aqueous hydrogen chloride solution whereby a precipitate of aluminum chloride forms in said hydrogen chloride solution; withdrawing hydrogen chloride solution containing said precipitate suspended therein from the lower end of said extraction tower; separating said precipitate from said withdrawn hydrogen chloride solution; returning precipitate-free hydrogen chloride solution to the upper portion of said extraction tower; withdrawing treated alkylate stream, essentialy free of aluminum chloride, from the upper end of said extraction tower; passing said treated alkylate stream to a hydrogen chloride and benzene stripping tower; withdrawing hydrogen chloride gas from the upper end of said stripping tower; withdrawing a stream of substantially pure benzene vapors as a sidestream from said stripping tower; condensing said benzene vapors and returning same to said alkylation zone; passing stripped alkylate from the bottom of said stripping tower to a fractionation zone; and fractionating said stripped alkylate stream in said fractionation zone to recover therefrom a product alkylate stream as said detergent grade alkylate.

8. Apparatus for removing aluminum chloride from hydrocarbon streams, said apparatus comprising, in combination: an extraction tower; first inlet conduit means connected to the lower portion of said tower for introducing a hydrocarbon stream into said extraction tower; second inlet conduit means connected to the upper portion of said tower for introducing a stream of concentrated aqueous hydrogen chloride into said extraction tower; means for separating a suspended solid from a liquid containing same; first outlet conduit means connected to the lower end of said extraction tower for withdrawing hydrogen chloride solution containing suspended aluminum chloride and passing same to said separation means; second outlet conduit means connected to the upper end of said tower for withdrawing treated hydrocarbon therefrom; and a conduit connected to the outlet of said separation means and said second inlet conduit means.

9. A process for removing aluminum chloride from a hydrocarbon stream, which process comprises contacting said hydrocarbon stream with a concentrated aqueous solution of hydrogen chloride whereby a precipitate of aluminum chloride forms in said hydrogen chloride solution, and separating said hydrogen chloride solution containing said precipitate from said hydrocarbon stream.

References Cited

UNITED STATES PATENTS 2,404,551    7/1946    Upham _____ 23—96 X

OTHER REFERENCES

Mellor: "A Comprehensive Treatise on Inorganic and Theoretical Chemistry," vol. V, Longmans, Green & Co., London 1924, pp. 314 and 315.

DELBERT E. GANTZ, Primary Examiner.

C. R. DAVIS, Assistant Examiner.